(12) United States Patent
Hiscock et al.

(10) Patent No.: US 6,560,237 B1
(45) Date of Patent: May 6, 2003

(54) PACKET ORDER ASSURANCE MECHANISM

(75) Inventors: James Scott Hiscock, Rockport, MA (US); Benny Siman-Tov, Framingham, MA (US); Terrence Hussey, Merrimack, NH (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/353,411

(22) Filed: Jul. 15, 1999

(51) Int. Cl.$^7$ .......................... H04L 12/28; H04L 12/56
(52) U.S. Cl. ...................... 370/412; 370/390; 370/392
(58) Field of Search ................................. 370/232, 235, 370/352, 354, 381, 382, 383, 392, 395.21, 395.42, 395.43, 412, 413, 415, 417, 419, 422, 428, 432, 255, 390, 397, 399, 395.31, 395.32

(56) References Cited

U.S. PATENT DOCUMENTS 6,185,221 B1 * 2/2001 Aybay ........................ 370/412
6,349,097 B1 * 2/2002 Smith ........................ 370/390

OTHER PUBLICATIONS

Dominguez J., ATM Forum Library, Education Corner, On–Line Publishing Jun. 1998.
The ATM Forum Technical Committee, "LAN Emulation Over ATM, Version 1.0" Jan. 1995.

* cited by examiner

Primary Examiner—David Vincent
Assistant Examiner—Phirin Sam
(74) Attorney, Agent, or Firm—Weingarten, Schurgin, Gagnebin & Lebovici LLP

(57) ABSTRACT

Packets received by a network device such as a switch are queued to either a multicast or unicast queue depending on whether a valid mapping of the packet destination address to an output port of the device exists. Each queued packet is marked with a service era during which the message is queued. The service era is advanced whenever a port mapping for a destination address becomes established and the multicast queue is non-empty. The device monitors the presence of packets on the multicast queue and the transfer of packets from the multicast queue to the output ports. A message is forwarded from the unicast queue to an output port only if the multicast queue was empty at the time the mapping was established, or if all messages on the multicast queue from service eras earlier than the service era of the message on the unicast queue have been transferred to the output port. The multicast queue is monitored via a synchronization flag variable that is updated whenever a packet is forwarded from the multicast queue. A packet is forwarded from the unicast queue only if it is marked with an era no later than the value of the synchronization flag.

4 Claims, 3 Drawing Sheets

PACKET ORDER ASSURANCE MECHANISM

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of network communications, and more particularly to techniques for maintaining the ordering of packets in a stream of packets being sent to a destination network node from a source network node.

A common requirement for network communications is that packets or frames being transmitted by a source node arrive at a destination node in the same order as transmitted by the source node. For example, the contents of a long message may be distributed among several packets, and coherent parsing of the message at the destination node depends upon the ability to correctly re-assemble the message from its constituent packets. Alternatively, a message conveyed in one packet may provide information about a later-transmitted or earlier-transmitted message, and the correct identification of the related message relies upon receiving the related packets in the same order as originally transmitted.

One reason why it is possible for packets to be delivered out of order is the use of different mechanisms for providing packet-forwarding services in network devices such as switches. In particular, a change from one service mechanism to another can potentially result in out-of-order delivery. The problem arises when the new service is capable of delivering packets faster than the previous service, at least in the period right after the transition. One or more packets handled by the new service are delivered before previously transmitted packets still being processed by the previous service.

A known example of such a service transition can occur when a network device such as a switch learns the location of a network node that is receiving a stream of packets. When the switch does not have a valid mapping of a destination node address to an output port of the switch, the switch employs a technique known as "multicasting" to transmit packets toward the destination node. Packets received at an input port of the switch are placed on a multicast queue at the input port, and from the multicast queue the packets are forwarded to multiple output ports. Once the switch establishes a port mapping for the destination node, however, subsequently received packets are placed on a unicast queue specifically associated with the output port at which the destination node is known to be reachable. Under certain conditions, packets from the unicast queue are forwarded to the output port before previously transmitted packets waiting on the multicast queue. This operation can result in out-of-order delivery of a stream of transmitted packets.

One prior approach to maintaining packet ordering is the use of "flush" protocols. When the conditions for a service transition are detected, a special packet known as a "flush" packet is sent through the previous service, and the new service is stalled until the flush packet or packets are looped back. In this manner it is guaranteed that any previously-transmitted packets being processed by the previous service have been delivered before any packets are delivered by the new service.

While flush protocols are effective in maintaining packet ordering, they suffer from undesirable drawbacks. The flush packets themselves consume valuable network resources, and the looping back involves delay and requires the assistance of an external device. It would be desirable to maintain packet ordering in networks without incurring the resource and other penalties of flush protocols.

BRIEF SUMMARY OF THE INVENTION

In accordance with the present invention, a packet order assurance mechanism is disclosed that operates without the need for explicit flush packets and their attendant delay and resource consumption.

According to the disclosed technique, each received packet or message is marked upon being queued to either a first queue or a second queue for forwarding to an output port. The marking indicates a service era during which the message is being queued. The service era is advanced whenever a service transition occurs and the first queue is non-empty. In one embodiment the first queue is a multicast queue used when a valid port mapping for the destination address of the packet does not exist.

The presence of packets on the first queue and the transfer of packets from the first queue to the output ports are monitored. A message is forwarded from the second queue to an output port only if either the first queue was empty at the time of the transition to the service era in which the message was queued to the queue, or if all messages on the multicast queue from a service era earlier than the service era of the message on the unicast queue are guaranteed to have been transferred to the output port. In this way, it is guaranteed that no earlier-transmitted packets are present on the multicast queue when a packet is forwarded from the unicast queue.

In a disclosed embodiment, a synchronization flag variable is used to track the contents of the multicast queue. The synchronization flag is updated whenever a packet is forwarded from the multicast queue. The synchronization flag is updated to either the current service era or the service era of the packet being forwarded. The synchronization flag is used to control the forwarding of packets from the unicast queue. In particular, a packet on the unicast queue must be marked with an era no later than the value of the synchronization flag in order to be forwarded.

Other aspects, features, and advantages of the present invention are disclosed in the detailed description that follows.

DETAILED DESCRIPTION OF THE INVENTION

Figure 1:
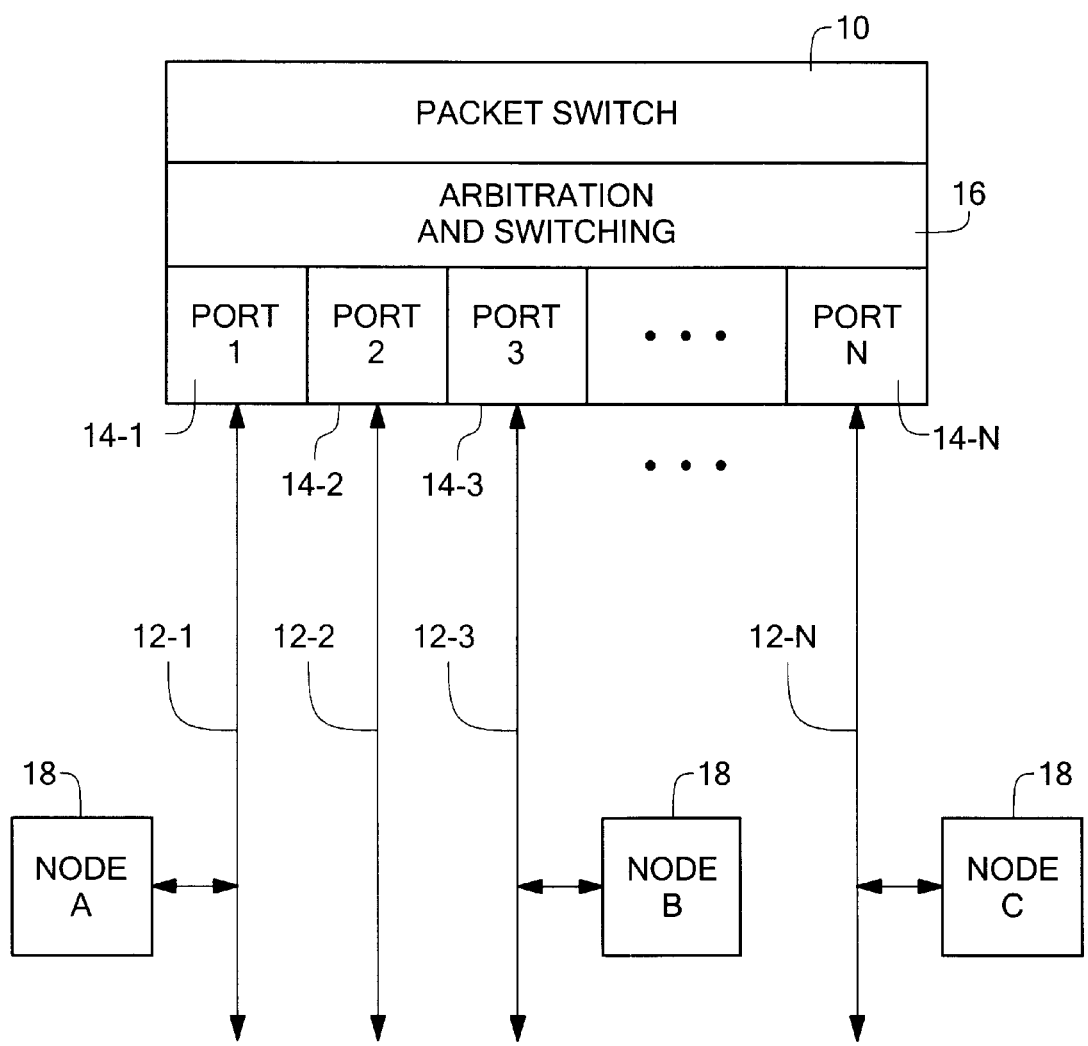
FIG. 1 is a block diagram of a simplified network configuration in which the present invention may be employed.

FIG. 1 shows a packet switch 10 connected to a plurality of network segments 12-1 through 12-n, each network segment being connected to a corresponding port 14-1 through 14-n of the switch 10. The switch 10 contains arbitration and switching logic 16 used to create connections between ports 14 for the transfer of packets. For illustration purposes, three nodes 18 are shown connected to the various network segments 12. The three nodes are referred to as nodes A, B and C. As shown, node A is connected to network segment 12-1, node B is connected to network segment 12-3, and node C is connected to network segment 12-n.

In operation, a network node on a given segment 12 communicates with a node on another segment 12 by creating a packet containing a destination address identifying the destination node, and sending the packet to the switch 10. The switch 10 maintains a mapping table that maps destination network addresses to the output ports 14. When a packet is received, logic within the receiving port 14 extracts the destination address from the packet header and supplies it to the mapping table. When a valid entry for the destination address exists in the mapping table, the entry contains the identity of the port 14 to which the packet should be forwarded to reach the destination node. The packet is then forwarded through the arbitration and switching logic 16 to the identified output port 14.

As an example, node A communicates with node B by sending packets to the switch 10 containing the destination address for node B. Logic within port 14-1 looks up node B in the mapping table. If a valid entry exists, it identifies port 14-3 as the port via which node B can be reached. The packet is then transferred from port 14-1 to port 14-3 via the arbitration and switching logic 16. Logic within the port 14-3 then transmits the packet to node B on the network segment 12-3. This mechanism is referred to as "unicasting".

The switch 10 learns port mappings by monitoring network traffic appearing on the segments 12. When the switch 10 observes a transmission on a given segment, it learns the address of the transmitting node, and then creates a mapping table entry associating the address with the port 14 on which the transmission is observed. The table entries are not maintained indefinitely, however. Table entries are periodically deleted from the table, to make room for newer entries that have been learned more recently, and to avoid the inadvertent use of stale mapping information. The locations of active nodes whose table entries are deleted are re-learned again after a brief period, and new table entries for the re-learned addresses are created. In the interim, however, the switch 10 does not have valid port mapping for such addresses.

When the switch 10 does not have a valid mapping entry for the destination address in a received packet, the switch 10 transmits the packet on all the attached network segments 12 on which the destination node might reside. This operation is termed "multicasting". The switch 10 uses a special mechanism for multicasting that is described in greater detail below. Multicasting continues for packets containing unmapped destination addresses until the switch 10 learns the addresses and creates valid mapping entries in the manner described above.

Figure 2:
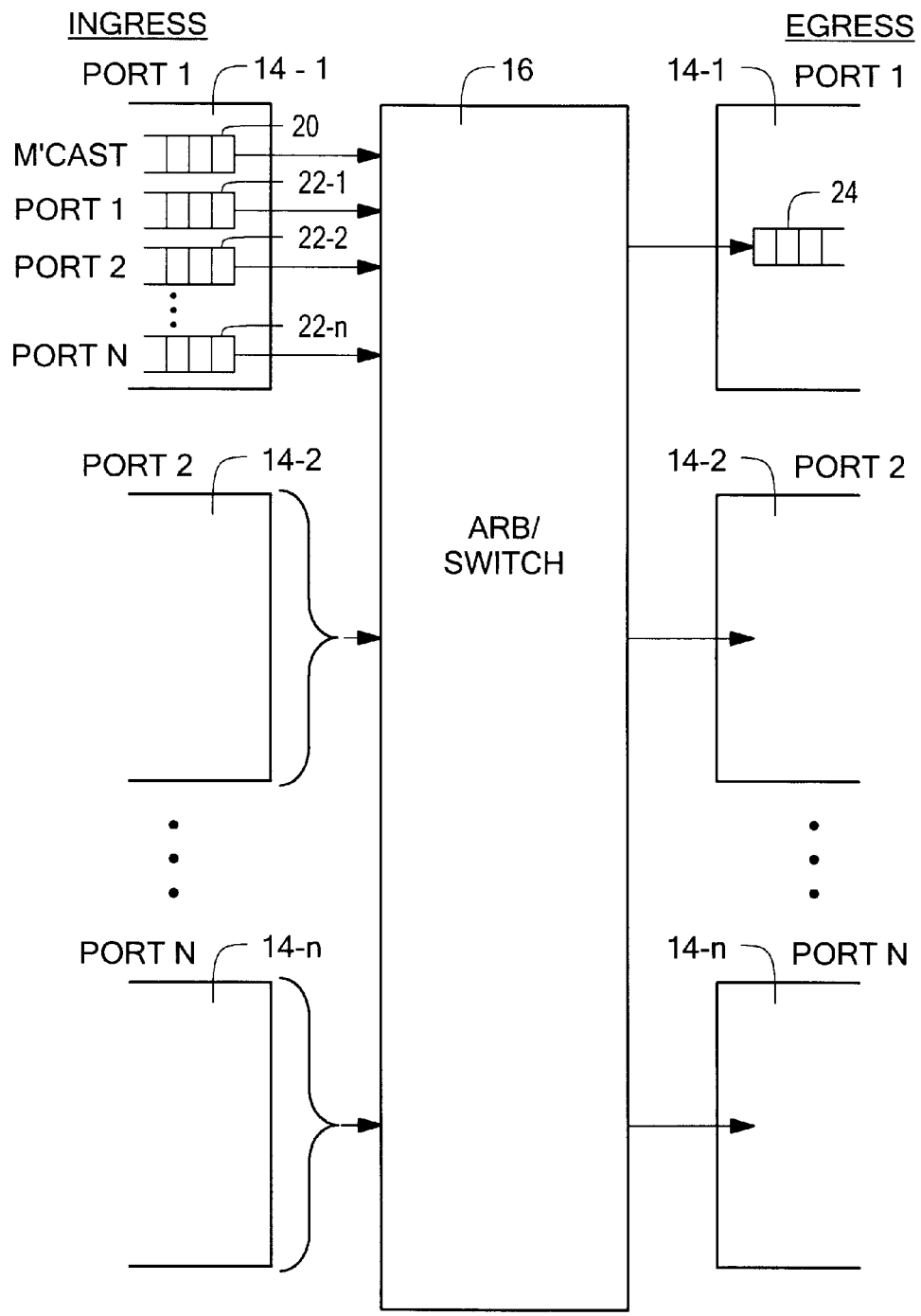
FIG. 2 is a block diagram of a portion of a packet switch in the network of FIG. 1.

FIG. 2 shows structure within the switch 10 that is used for packet forwarding. Each port 14 includes an ingress function and an egress function, which reside functionally on opposite sides of the arbitration and switching logic 16 as shown. Packets are received by the ingress function of a port 14, forwarded to the egress function of one or more ports 14, and then transmitted on the network segments 12 attached to the ports 14 to which the packet has been forwarded.

The ingress function within each port 14 includes a multicast queue 20 and a plurality of unicast queues 22 that are used to temporarily store received packets being forwarded to another port 14. Packets that are to be multicast to multiple output ports are placed on the multicast queue 20. When a packet reaches the head of the multicast queue 20, the arbitration and switching logic 16 forwards a copy of the packet to an input queue 24 in each destination port 14. The packet is then transmitted on the corresponding network segments 12 by the egress functions. As described above, multicasting is used when a mapping between a destination address of a packet and a specific port 14 has not been established.

Each unicast queue 22 is associated with a particular port 14, and is used by the ingress function to forward packets to the input queue 24 in the associated port 14 when a mapping between the destination address and the port 14 has been established. Thus in the above example in which node A sends a packet to node B, the ingress function in port 14-1 places the packet on the unicast queue 22-3, which is associated with port 14-3. When the packet reaches the head of the queue 22-3, it is transferred to the input queue 24 of port 14-3 by the arbitration and switching logic 16. The egress function of port 14-3 then transmits the packet to node B on the network segment 12-3.

Figures 3, 4, 5:
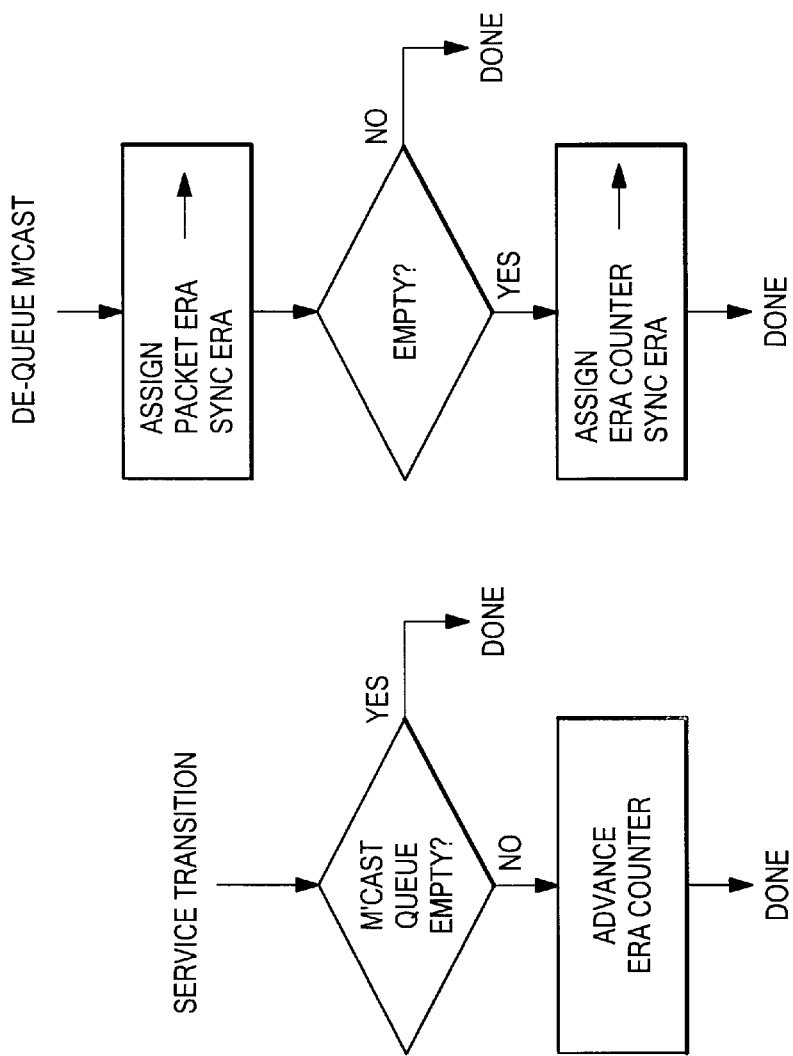
FIG. 3 is a flow diagram showing how a service era counter is advanced during the operation of the switch of FIG. 2.
FIG. 4 is a flow diagram showing the conditions for updating a synchronization flag used in packet forwarding decisions in the switch of FIG. 2.
FIG. 5 is a flow diagram showing a packet-forwarding decision process using the synchronization flag of FIG. 4.

FIGS. 3 through 5 illustrate a process by which the ordering of a stream of packets for a given destination is maintained despite the occurrence of a "service transition" that could otherwise cause out-of-order delivery. In the illustrated embodiment, a service transition is said to occur when a destination address becomes known to the switch 10. Prior to the service transition, any received packets containing the unknown destination address are forwarded using the multicast mechanism and multicast queue 20 of the receiving port 14. After the service transition, received packets containing the now-known destination address are forwarded using the unicast mechanism and the appropriate unicast queue 22 of the receiving port 14.

The switch 10 maintains an "era counter" used to track successive time intervals referred to as "eras". As shown in FIG. 3, the era counter is advanced when a service transition occurs and the multicast queue 20 is not empty. This is precisely the situation in which it is possible for packets to become mis-ordered. The possibility arises because subsequently received packets for the destination node will be placed on a unicast queue 22, and forwarded from the unicast queue 22 to the port 14 for the destination node. If the multicast queue 20 is not empty at the time of the service transition, then it may contain a previously transmitted packet from the same stream for the same destination node. This packet may be delayed in the multicast queue 20, for example because a previously queued packet is awaiting the availability of transmission resources at a port. If the delay is long enough, a subsequently received packet may be forwarded from the unicast queue 22 before the packet on the multicast queue 20 is forwarded. In such a case, the packets will have been delivered out of order. Thus, the era counter tracks the occurrence of conditions under which a packet-ordering hazard may exist.

A single era counter is used globally within the switch 10. The era counter is advanced upon a service transition at any port 14 when the multicast queue 20 for the port 14 is non-empty.

When a packet is queued to either a multicast queue 20 or a unicast queue 22, it is marked by storing the value of the era counter in association with the packet. In this way, the arrival time of the packet with respect to potentially hazardous service transitions is known. This marking is used in a manner described below to control the forwarding of packets from a unicast queue 22.

FIG. 4 shows actions taken when a packet is dequeued from a multicast queue 20 for forwarding to the egress functions of the ports 14. The era value with which the packet is marked is assigned to a flag variable referred to as a "synchronization era" or "sync era". If the multicast queue 20 has become empty, the value of the era counter is assigned to the sync era flag. The sync era flag identifies the latest era with which a packet may be marked in order to be safely forwarded from a unicast queue without risking mis-ordering.

FIG. 5 shows actions taken when a packet is to be dequeued from a unicast queue 22 for forwarding to the egress function of a corresponding port 14. The era with which the packet is marked is compared to the sync era flag, and the packet is forwarded to the destination port 14 only if the packet era is less than or equal to the sync era. If the packet era exceeds the sync era, the packet remains queued until the sync era flag has been advanced to the point that it at least equals the packet era. This happens either when the multicast queue 20 becomes empty, or when a packet from a later era is dequeued from the multicast queue 20.

It is preferable that the sync era flag be a per-port variable, i.e., that there be separate sync era flags for each port 14 that are each updated based only on activity of the port's multicast queue 20. It may be possible to employ a single global sync era flag which is updated based on the activity of the multicast queues 20 of all the ports 14. However, this arrangement would generally introduce unnecessary delay into some packet streams. Packets would tend to wait in unicast queues 22 for multicast queues 20 of other ports to become empty, a condition that is not necessary to maintain proper ordering of each packet stream.

An example is presented to illustrate the operation of the process of FIGS. 3–5. The pertinent events are summarized in Table 1 below.

TABLE 1

Example

| TIME | EVENT | ERA CTR | SYNC FLAG | QUEUE CONTENTS |
|------|-------|---------|-----------|----------------|
| t0 | Init. | 0 | 0 | MQ: - |
|    |       |   |   | UQn: - |
| t1 | M1 rec'd | 0 | 0 | MQ: M1/0 |
| t2 | P1 rec'd | 0 | 0 | MQ: P1/0; M1/0 |
| t3 | B learned | 1 | 0 | |
| t4 | P2 rec'd | 1 | 0 | UQ3: P2/1 |
| t5 | M1 fwd'd | 1 | 0 | MQ: P1/0 |
| t6 | P1 fwd'd | 1 | 1 | MQ: - |
| t7 | P2 fwd'd | 1 | 1 | UQ3: - |

At time t0, the system is initialized. The value of the era counter and the sync era flag are set to zero. Both the multicast queue 20 and all of the unicast queues 22 are assumed empty. Also, there is assumed no valid mapping entry for network node B.

At time t1, a packet labeled M1 is received having a destination address for node B on port 14-3. This packet is marked with "0", the value of the era counter, and placed on the multicast queue. In the above table, this action is reflected by the updated queue status of "MQ: M1/0", which indicates that packet M1 with a marking of "0" resides on the multicast queue.

At time t2, a packet labeled P1 is received, also destined for node B. Because no valid port mapping exists, this packet is placed on the multicast queue behind packet M1.

At time t3, the address for node B is learned, for example in response to observing a transmission initiated by node B on the network segment 12-3. Because the multicast queue is non-empty at the time of this service transition, the era counter is incremented to 1.

At time t4, a packet labeled P2 is received, also destined for node B. Because address B is now known, this packet is placed on the unicast queue for port 14-3, referred to in Table 1 as "UQ3". The packet is marked with the era "1", and because this value is greater than the value of the sync flag, it cannot yet be forwarded to port 14-3.

At time t5, the packet M1 is de-queued from the multicast queue and forwarded to the egress function in port 14-3 for transmission to node B. The era value of packet M1 is assigned to the sync flag, which results in the sync flag's retaining the value of "0". Packet P1 remains on the multicast queue. Packet P2 must remain on UQ3, because the sync flag has not yet become equal to the era marking of P2.

At time t6, packet P1 is de-queued from the multicast queue and forwarded to port 14-3. The multicast queue becomes empty, and thus the sync flag is set equal to the value of the era counter, which is "1". This condition enables the subsequent de-queuing of packet P2 at time t7.

At time t7, the packet P2 is forwarded to port 14-3, and the queue UQ3 becomes empty.

The foregoing has described a mechanism for maintaining packet ordering when a service transition occurs. Although the mechanism has been described with reference to a particular embodiment, it may be embodied in other ways as well. For example, the mechanism may be used with other queue structures that allow for the possibility of packets from a single stream being delivered to a destination node from different queues.

It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of transferring a stream of messages received at an ingress port of a network device, the messages being destined for a destination network node, to an egress port of the network device in the same order in which the messages are received, comprising:

upon receiving each message, (i) queuing the message to a first queue if a first service mechanism is being used to transfer the messages to the egress port, and queuing the message to a second queue if a second service mechanism is being used to transfer the messages to the egress port, and (ii) marking the queued message in a manner indicating a service era during which the message is being queued;

advancing the service era upon at least every service transition from the first service mechanism to the second service mechanism occurring when the first queue is non-empty;

monitoring the presence of messages in the first queue and the service era marking of messages transferred from the first queue to the egress port; and transferring each of said messages queued on said second queue from the second queue to the egress port only if at least one of the following conditions is satisfied: (i) there were no messages in the first queue at the time of the transition to the service era with which the message being transferred is marked, and (ii) none of said messages stored on said first queue are marked with service eras earlier than the service era with which the message being transferred is marked.

2. A method according to claim 1, wherein (i) the egress port is one of multiple egress ports on the network device, (ii) the first queue is a multicast queue used to forward messages from the ingress port to multiple egress ports, (ii) the first service mechanism comprises forwarding a message from the multicast queue to multiple egress ports including the one egress port, (iii) the second queue is a unicast queue used to forward messages from the ingress port to the one egress port specifically, (iv) the second service mechanism comprises forwarding a message from the unicast queue to the one egress port, and (v) the transition from the first service mechanism to the second service mechanism occurs when a mapping from an address of the destination node to an egress port of the network device is established.

3. A method according to claim 1, wherein the monitoring step comprises (i) determining, upon forwarding each of said messages queued on said first queue from the first queue to the egress port, whether the first queue has become empty, (ii) if the first queue is determined to have become empty, then assigning the, present service era to a synchronization flag variable, and (iii) otherwise, assigning the service era value of the forwarded message to the synchronization flag variable, and wherein the condition for transferring each of said messages queued on said second queue from the second queue to the egress port is deemed satisfied if the service era value of the message to be transferred is less than or equal to the value of the synchronization flag variable.

4. In a switch having at least one ingress port and multiple egress ports, a method of assuring that packets received at the ingress port destined for a destination network node reachable via one of the egress ports are transmitted from the egress port in the same order in which they are received, comprising:

during a time prior to a service transition when the switch identifies the one egress port as the port on which the destination node may be reached, enqueuing the received packets to a multicast queue, each enqueued packet having associated therewith a respective tag indicating the value of an era counter at the time the packet was enqueued;

after the service transition, enqueuing the received packets to a specific destination queue associated with the one egress port, each enqueued packet having associated therewith a respective tag indicating the value of the era counter at the time the packet was enqueued;

upon the occurrence of the service transition, determining whether any packets are enqueued to the multicast queue, and if so then advancing the era counter;

upon dequeuing a packet from the multicast queue for forwarding to the egress ports of the switch, performing the steps of (i) if the multicast queue has become empty, assigning the value of the era counter to a synchronization flag variable, and (ii) otherwise, assigning the tag value of the dequeued packet to the synchronization flag variable; and dequeuing a packet from the specific destination queue for forwarding to the one egress port only if the tag value of the packet is less than or equal to the synchronization flag variable.

* * * * *